Aug. 1, 1944.  E. BAIRD  2,354,732
METHOD OF AND MEANS FOR CONTROLLING THE PERCENTAGE
OF WATER IN LIQUID AND SOLID CARBON DIOXIDE
Filed July 24, 1942
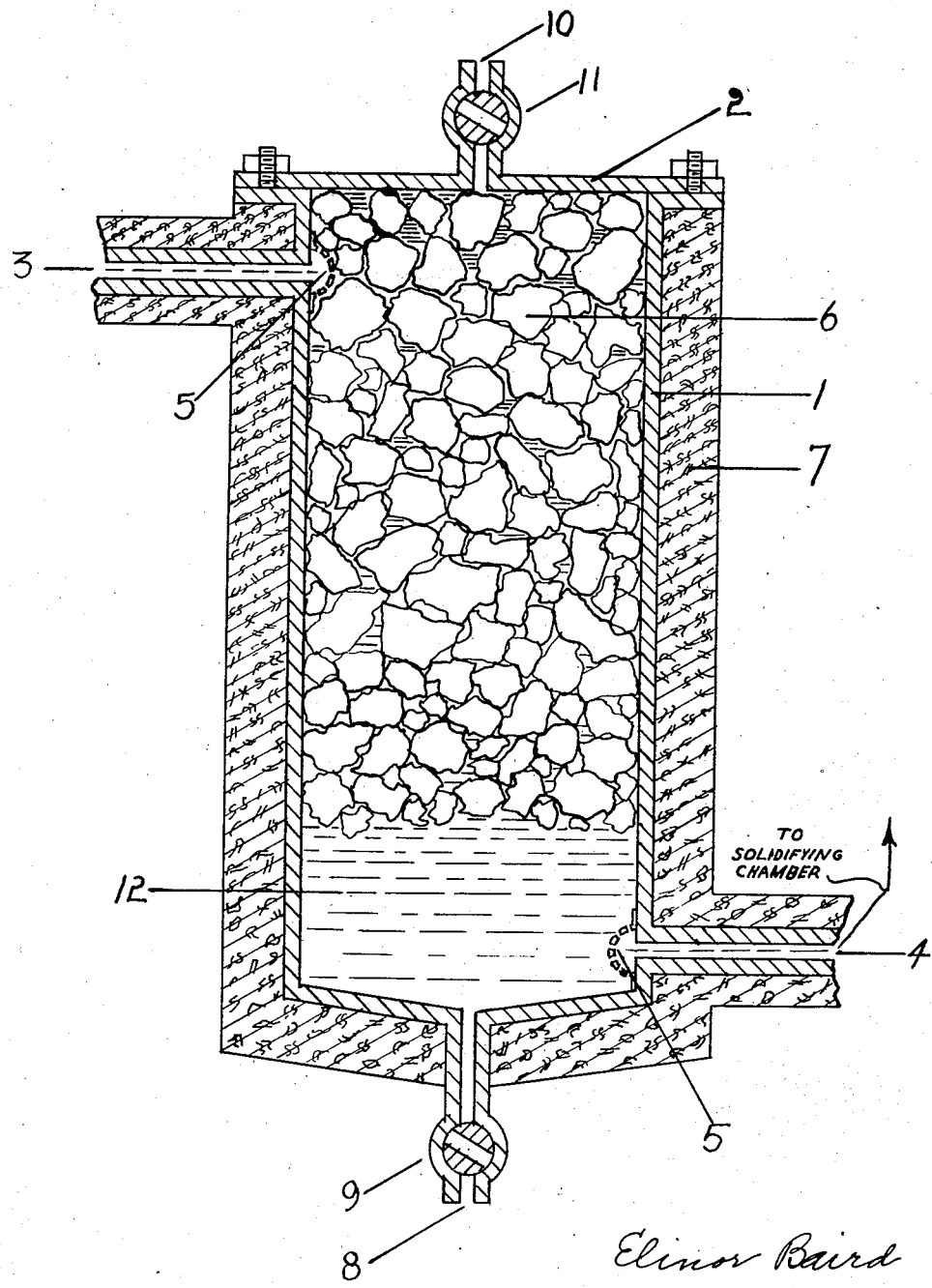
Elinor Baird
INVENTOR.

Patented Aug. 1, 1944

2,354,732

UNITED STATES PATENT OFFICE 2,354,732

METHOD OF AND MEANS FOR CONTROLLING THE PERCENTAGE OF WATER IN LIQUID AND SOLID CARBON DIOXIDE

Elinor Baird, Los Angeles, Calif.

Application July 24, 1942, Serial No. 452,168

13 Claims. (Cl. 62—91.5)

This invention relates to methods of and means for controlling the percentage of water in liquid and solid carbon dioxide.

The general object of this invention is automatically and continuously to control the percentage of water dissolved in liquid carbon dioxide and to produce a solution containing a predetermined percentage of water, but substantially free from undissolved water, ice, or solid hydrates of carbon dioxide.

A further object of this invention is to produce solid carbon dioxide in which a predetermined percentage of water is uniformly dispersed throughout the solid mass. This is desirable because pure solid carbon dioxide exhibits a commercially objectionable tendency to crack, to become granular in structure so that cakes fall apart readily upon handling, and even to disintegrate spontaneously if kept long in storage. This may be due to the fact that large crystals grow at the expense of smaller adjacent crystals, so that a mass composed of crystals of various sizes may, in a short time consist principally of large crystals of greater density than the average for the mass as a whole, and therefore having interstices between them. Mechanical or thermal stresses may develop such interstices into planes of cleavage along which cracks may form and produce in solid carbon dioxide the "sandy" or "sugary" granular condition which renders it unsatisfactory commercially. Whatever the cause of this phenomenon, experience has proven that the addition of small percentages of adulterants such as water, oil and other materials to carbon dioxide markedly improves the physical characteristics of the solid carbon dioxide made from it and delays or prevents this tendency to crack, break or became granular. This has been variously explained by suggesting that molecules of the adulterant cannot enter into the carbon dioxide crystal lattice and that by standing in the way, they hinder the migration of carbon dioxide molecules which might otherwise enter the lattice, thus retarding the growth of large crystals. It is likewise possible that adulterant molecules, or molecules of compounds of carbon dioxide and the adulterant, act as a bond between adjacent carbon dioxide crystals; or that the adulterant so modifies the freezing point of the mass as to render it more plastic and less brittle. Without committing myself to any of these theories, I have found that the effectiveness of the adulterants ordinarily used for this purpose is proportionate to the degree to which the adulterant is dispersed throughout the mass of solid carbon dioxide, and that a high degree of dispersal is best accomplished by dissolving the adulterant in the liquid carbon dioxide from which the solid is made. Furthermore I have found that it is useless and generally undesirable to add more of any adulterant than can actually be dissolved in the liquid carbon dioxide.

Water offers many advantages over other adulterants used or suggested for this purpose. It is universally available; it is cheap; and it is unobjectionable when the solid carbon dioxide is used as a refrigerant for foods or is converted to liquid carbon dioxide for carbonating beverages. The first step in the manufacture of solid carbon dioxide is the production of liquid carbon dioxide, and in this process it is usual to dry the gas as thoroughly as practicable for the purpose of removing water-soluble odors and impurities, or to prevent corrosion which may result under certain conditions when moisture is present in carbon dioxide, or to prevent possible clogging of the apparatus by solid hydrates of carbon dioxide, or to prevent clogging of the apparatus when, during the process of liquidifaction, the temperature of the carbon dioxide is sufficiently reduced as to form ice within the liquifying apparatus. In commercial practice this drying is usually accomplished by condensing the moisture and withdrawing it from the apparatus as a liquid, or by passing the carbon dioxide through material capable of absorbing or adsorbing water. The effectiveness of these methods of drying will vary from time to time with variations in the initial moisture content of the carbon dioxide, the temperature and/or degree of saturation of the drying medium, the rate at which carbon dioxide flows through the dehydrating equipment, and other factors. Thus the carbon dioxide is seldom completely dired, and the amount of residual moisture varies, but when the liquid carbon dioxide has been fully prepared for freezing into solid carbon dioxide it usually has in solution less than the optimum percentage of water for producing solid carbon dioxide possessing commercially desirable physical characteristics. Thus if water is to be used as an adulterant for producing these characteristics, additional water must usually be added to the liquid carbon dioxide just before it is solidified. At this stage of the process the liquid carbon dioxide is usually very cold—frequently in the neighborhood of −40° F. Efforts have been made to dissolve water in the liquid carbon dioxide by injecting steam into it, or by injecting into it gaseous carbon dioxide saturated with moisture, etc., but these methods have the disadvantages that, upon contact with the cold liquid carbon dioxide or the apparatus containing it, the moisture thus injected immediately freezes, often partially or wholly clogging the injecting orifice so that it is difficult to know at any given time whether any moisture is being injected and if so, how much. Furthermore, even when such injectors operate at all it is difficult or impossible to correlate the rate of injection with the percentage of residual water which the liquid carbon dioxide has in solution so that the total water finally dissolved in it shall at all times be at the optimum percentage. Likewise it is difficult or impossible by prior methods to correlate the rate of moisture injection with the rate at which liquid carbon dioxide is being solidified so as continually and consistently to maintain the percentage of water in solution at the optimum value. It is another disadvantage of prior methods that they raise the temperature of the liquid carbon dioxide into which the water is injected, which reduces the efficiency of the apparatus for producing solid carbon dioxide. It is a further object of this invention automatically and continuously to bring the percentage of water dissolved in the liquid carbon dioxide up to the optimum value without possibility of exceeding that value and without appreciably raising the temperature of the liquid carbon dioxide. Still further objects and advantages of this invention will appear more fully hereinafter.

The principle of this invention is capable of receiving a variety of expressions, one of which, for the purpose of illustration, is shown in the accompanying drawing, wherein the figure is a sectional view of apparatus embodying the invention.

Referring to the figure, the apparatus includes a suitable container 1 adapted to contain liquid carbon dioxide, and provided with the removable closure 2. The inlet 3 provides means for introducing the liquid carbon dioxide 12 into the container 1 and the outlet 4 provides means for withdrawing it therefrom. The openings of the inlet 3 and the outlet 4 are provided with the screens 5 to prevent the passage of solids, such as the ice 6. The container 1, the inlet 3 and the outlet 4 are partially or wholly surrounded by the heat insulation 7. The bottom of the container 1 is provided with the drain 8, which is provided with the valve 9. The removable closure 2 is provided with the vent 10, which is equipped with the valve 11.

The operation of the apparatus illustrated in the figure is as follows—Starting with the apparatus empty and at ordinary atmospheric temperature, the valve 9 is opened to permit any water or gas in the container 1 to escape through the drain 8. The valve 9 is then closed, the closure 2 is removed, and the container 1 is filled with cracked ice to which has been added enough cracked solid carbon dioxide to cool the container 1 down to or below the temperature at which it is to be operated and to prevent the cracked ice 6 from melting while this cooling is occurring. The amount of cracked solid carbon dioxide necessary to accomplish these purposes will, of course, vary with the initial temperature of the apparatus, its specific heat, etc., but 25% by weight of cracked solid carbon dioxide in the mixture will ordinarily be sufficient. The closure 2 is then fastened securely in position, the valve 11 is closed, and gaseous carbon dioxide at a temperature below 32° F. is allowed to flow into the container 1 through the inlet 3 and to flow out through the outlet 4 until all or most of the air within the container 1 has been swept out. Liquid carbon dioxide which is ready for solidification and is at a temperature below 32° F. is then admitted through the inlet 3 and allowed to accumulate until all space within the container 1 not already occupied by ice has been substantially filled. The liquid carbon dioxide 12 is then permitted to flow out through the outlet 4 to the solidifying apparatus at the same rate as that at which it enters the container 1, so that the container 1 at all times contains liquid carbon dioxide and cracked ice which are in intimate contact with each other. If the liquid carbon dioxide contains other gases which are above their critical temperatures, such as air, the valve 11 should be opened slightly at suitable intervals for the purpose of purging such gases from the container 1 so as to keep it at all times substantially full of liquid carbon dioxide and the cracked ice 6. Liquid carbon dioxide withdrawn through the outlet 4 flows directly to the solidifying apparatus. It would of course be possible to reverse the direction of the flow of liquid carbon dioxide through the container 1, but it is usually preferable to introduce it at the top and withdraw it from the bottom because the cracked ice 6, being lighter than the liquid carbon dioxide 12, floats to the top, thus reducing the likelihood of the screen 5 at the outlet 4 being clogged with particles of ice.

In operation it is desirable that the cracked ice 6 shall present a sufficiently large surface area to the liquid carbon dioxide flowing through the container 1 to permit enough of the cracked ice 6 to dissolve in the liquid carbon dioxide so that the solution becomes substantially saturated for the particular temperature prevailing in the container 1 before it is withdrawn therefrom. The cracked ice 6 should be replenished at suitable intervals. The heat insulation 7 insulates the container 1 against outside heat, so that when considerable quantities of liquid carbon dioxide flow substantially continuously through the container 1 the temperature of its contents approximates closely that of the entering carbon dioxide. Under these conditions the temperature at which the liquid carbon dioxide is admitted to the container 1 determines the percentage of water dissolved in it when it is withdrawn. When the amount of liquid carbon dioxide flowing through the container 1 is too small to maintain the optimum temperature therein, or when the liquid carbon dioxide enters the container 1 at a temperature higher than optimum, any convenient method of refrigeration may be utilized to maintain the container 1 and its contents at the optimum temperature. It will be obvious that the container 1 and its contents should be maintained at some temperature below 32° F. to avoid melting the cracked ice 6, and temperatures between —20° F. and —40° F. are preferable.

It is obvious that many changes and modifications can be made in the apparatus herein illustrated and described and that many of the details are capable of being embodied in different but equivalent structures without departing from the spirit or scope of the invention as defined by the following claims.

I claim:

1. In apparatus for dissolving water in carbon dioxide, in combination a container, a mass of ice within said container, and means for introducing carbon dioxide into contact with said ice and withdrawing it therefrom.

2. In apparatus for dissolving water in carbon dioxide at below 30° Fahrenheit, in combination a container, means for retaining a mass of ice within said container, and conduits for introducing carbon dioxide at below 30° Fahrenheit into contact with said ice and withdrawing it therefrom.

3. In apparatus for dissolving water in cold liquid carbon dioxide, in combination a container adapted to contain a mass of ice presenting a large surface area for contact with cold liquid carbon dioxide, and means whereby additional cold liquid carbon dioxide is admitted into contact with said ice as portions of the solution formed within the said container are withdrawn therefrom.

4. In apparatus for dissolving water in liquid carbon dioxide, in combination a container, a mass of ice within said container, and means for introducing liquid carbon dioxide into contact with said ice and withdrawing it therefrom.

5. In apparatus for dissolving water in liquid carbon dioxide, in combination a container, a mass of ice within said container, and conduits whereby liquid carbon dioxide flows through said container in contact with said ice.

6. In apparatus for dissolving water in liquid carbon dioxide at below 30° Fahrenheit, in combination a container, a mass of ice within said container, conduits for introducing liquid carbon dioxide at below 30° Fahrenheit into contact with said ice and withdrawing it therefrom, and means for retaining the undissolved portion of said ice within said container.

7. In apparatus for dissolving water in liquid carbon dioxide, in combination a container, means for retaining a mass of ice within said container, and conduits for introducing liquid carbon dioxide into contact with said ice and withdrawing it therefrom.

8. In apparatus for dissolving water in liquid carbon dioxide at temperatures below 30° Fahrenheit, in combination a container, means for retaining a mass of ice within said container, means for introducing liquid carbon dioxide at temperatures below 30° Fahrenheit into contact with said ice and withdrawing it therefrom, and means for retarding the transfer of heat from outside to the contents of said container.

9. That method of dissolving water in liquid carbon dioxide which comprises passing said liquid carbon dioxide through a container wherein it is in contact with ice while at a temperature below 30° Fahrenheit.

10. That method of dissolving water in liquid carbon dioxide at temperatures below 30° Fahrenheit which comprises maintaining said liquid carbon dioxide in contact with a mass of ice presenting a large surface area until a portion of said ice shall have dissolved in said liquid carbon dioxide, and subsequently separating the resultant solution from the undissolved portion of said ice.

11. That method of dissolving a predetermined percentage of water in liquid carbon dioxide at temperatures below 30° Fahrenheit which comprises maintaining said liquid carbon dioxide in contact with a mass of ice at that temperature at which only the desired percentage of water is soluble in said liquid until the resultant solution attains equilibrium, and subsequently separating said solution from the undissolved portion of said ice.

12. That method of dissolving water in liquid carbon dioxide at temperatures below 30° Fahrenheit which comprises introducing the said liquid carbon dioxide into a container wherein it is in contact with a mass of ice until a portion of said ice shall have dissolved in said liquid carbon dioxide, and subsequently withdrawing the resultant solution from said container while retaining the undissolved portion of said ice within said container.

13. That method of dispersing water in solid carbon dioxide which comprises maintaining ice in contact with liquid carbon dioxide at temperatures below 30° Fahrenheit until a portion of said ice shall have dissolved in said liquid carbon dioxide and subsequently freezing the resultant solution.

ELINOR BAIRD.